United States Patent [19]

Kodaira et al.

[11] Patent Number: 4,708,454
[45] Date of Patent: Nov. 24, 1987

[54] SHUTTER CONTROL APPARATUS FOR USE IN VARIABLE FOCAL LENGTH CAMERA

[75] Inventors: Takanori Kodaira, Tokyo; Akira Egawa, Machida, both of Japan

[73] Assignee: Canon Kabushiki Kaisha, Tokyo, Japan

[21] Appl. No.: 936,786

[22] Filed: Dec. 2, 1986

[30] Foreign Application Priority Data

Dec. 17, 1985 [JP] Japan .................................. 60-283767

[51] Int. Cl.⁴ .......................... G03B 7/00; G03B 3/00; G03B 15/03
[52] U.S. Cl. .................................... 354/422; 354/435; 354/195.12
[58] Field of Search ................................ 354/413–422, 354/435–440, 456, 195.1, 195.12

[56] References Cited

U.S. PATENT DOCUMENTS

| 3,529,523 | 9/1970 | Haskell | 354/420 |
| 4,065,776 | 12/1977 | Iwata et al. | 354/422 |
| 4,122,466 | 10/1978 | Iwata | 354/413 |
| 4,494,850 | 1/1985 | Katsuma et al. | 354/416 |
| 4,500,191 | 2/1985 | Yamanaka | 354/422 X |
| 4,534,638 | 8/1985 | Hirohata et al. | 354/418 |

Primary Examiner—W. B. Perkey
Attorney, Agent, or Firm—Fitzpatrick, Cella, Harper & Scinto

[57] ABSTRACT

A shutter control apparatus for use with a variable focal length camera which has a lens shutter, a detecting means for detecting a fully opened state of the lens shutter, a discriminating means for discriminating the focal length of a photographing optical system, and a controlling means for closing the lens shutter in response to the detection of the fully opened state of the lens shutter made by the detecting means when the discriminating means determined that the photographing optical system has a longer focal length during flash photography.

8 Claims, 10 Drawing Figures

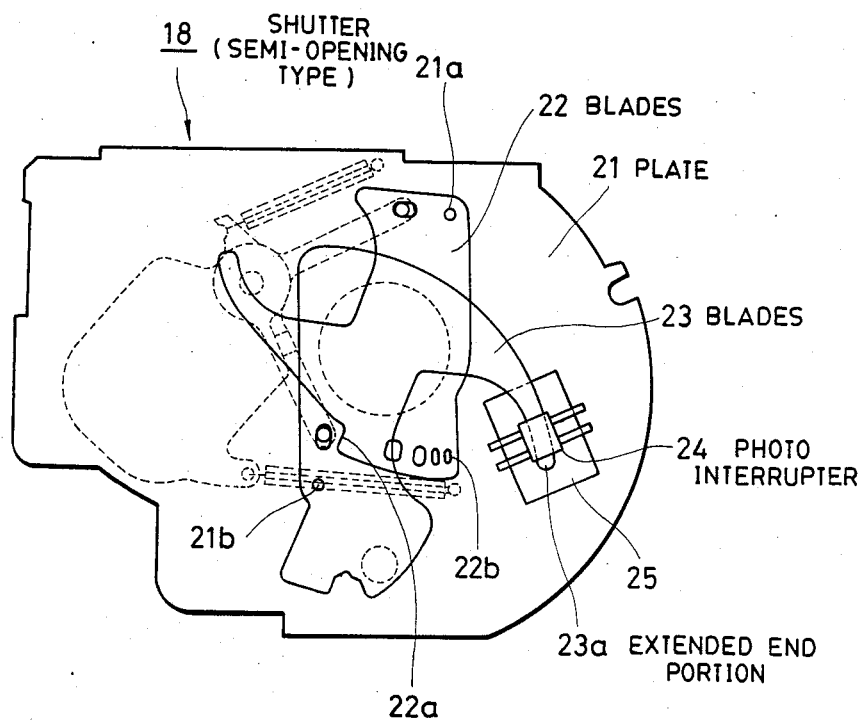
FIG. 2 PLAN VIEW OF SHUTTER

SHUTTER CONTROL APPARATUS FOR USE IN VARIABLE FOCAL LENGTH CAMERA

BACKGROUND OF THE INVENTION

1. Field of the Invention

This invention relates to a device for controlling a lens shutter and, more particularly, to a shutter control device suitable for flash photography.

2. Description of the Prior Art

Conventional lens shutter cameras have been so designed that the shutter-closing time during flash photography is set substantially at a limit whereby the effects of camera shake can be ovbiated (at a shutter speed of 1/f (focal length)) during flash photography and a fully-opened shutter condition is ensured.

Since this limit for obviating the effects of camera shake (hereinafter expressed as "camera-shake limit") changes as the focal length of a variable focal length camera changes, it is necessary to set the shutter-closing time such that the shortest possible shutter-opening duration (at the camera-shake limit for employing the longest focal length) is selected from those limits defined with respect to a series of such camera-shake limits at various focal lengths.

However, as a consequence of the foregoing, the shutter speed becomes undesirably high during short-focal-length photography so that a dimly lit background in the resulting photograph becomes completely dark because of considerable under-exposure even if a flash is used.

SUMMARY OF THE INVENTION

The present invention has been conceived to eliminate the above-described defect found in conventional devices and an object of the present invention is to provide a device suitable for shutter control in a variable focal length camera of a lens shutter type comprising a lens shutter; a detecting means for detecting a fully opened state of the lens shutter; a discriminating means for discriminating the focal length of a photographing optical system; and a controlling means for closing the lens shutter in response to the detection of the fully opened state of the lens shutter made by the detecting means when the discriminating means determines that the photographing optical system has a longer focal length during flash photography, whereby the effect of camera shake can be reduced when the focal length is long (the shutter-closing time is fast), and the effects of camera shake and complete darkness of the background in a picture can be prevented when the focal length is short (i.e. when the shutter-closing time is slow).

Other objects and features of the present invention will become clear on reading the following descriptions with respect to a preferred embodiment of the invention.

BRIEF DESCRIPTION OF THE DRAWINGS

FIG. 2 is a plan view of the general arrangement of a shutter;

FIGS. 5(a), 5(b) and 5(c) are diagrams each showing a signal wave form of an aperture detecting section;

DETAILED DESCRIPTION OF A PREFERRED EMBODIMENT

Figure 1A:
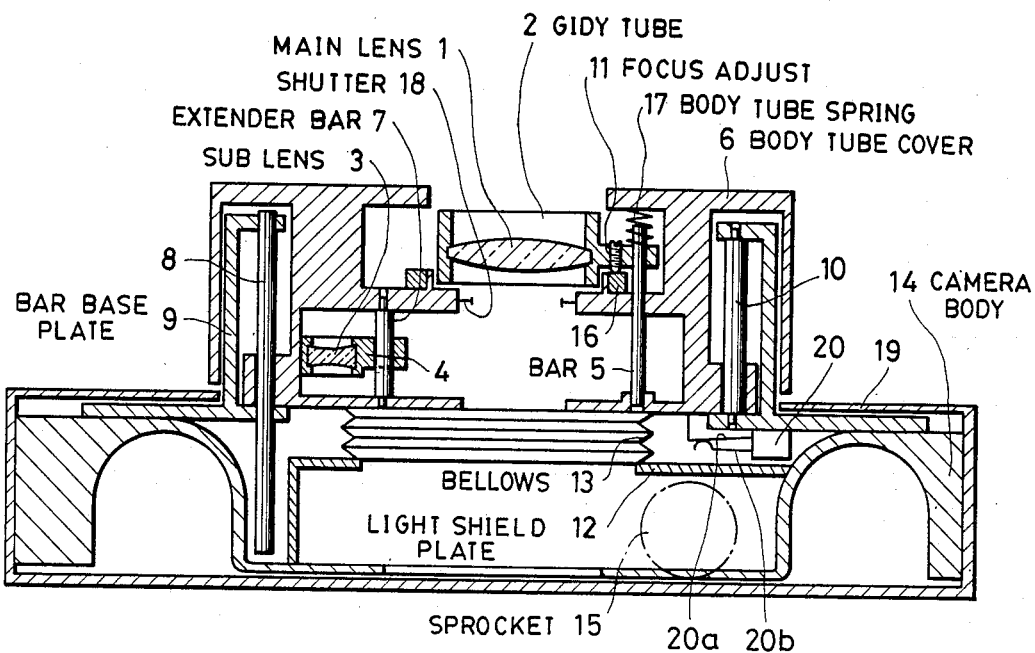
FIGS. 1(a) and 1(b) are longitudinal sectional views of a variable focal length camera embodying the present invention, with FIG. 1(a) showing a state of short focal length and FIG. 1(b) showing a state of long focal length.
Figure 1B:
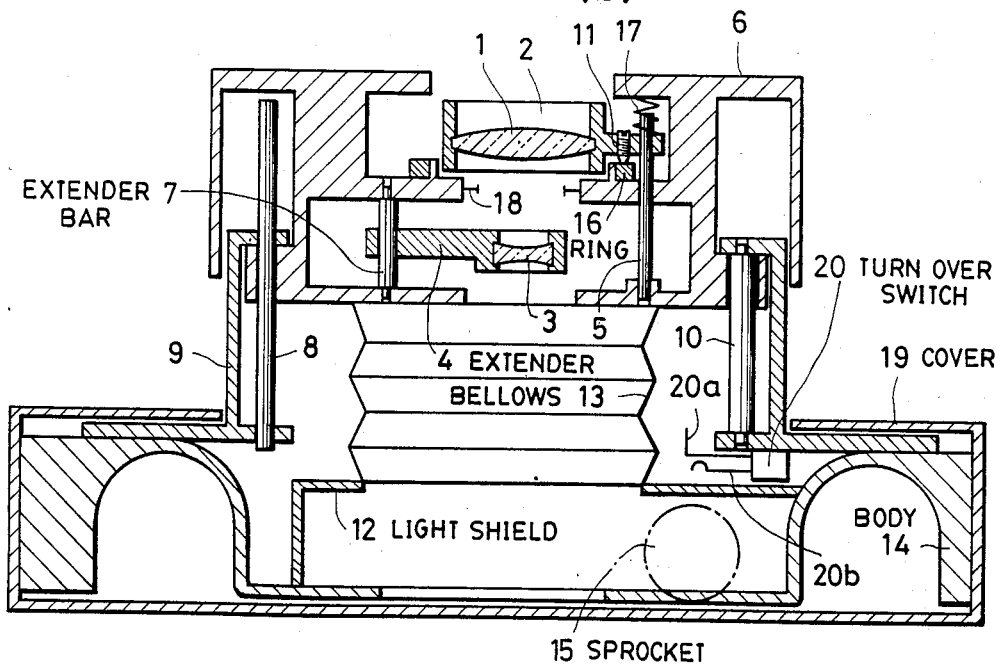

An embodiment of the present invention will be described hereinafter with reference to the accompanying drawings. FIGS. 1(a) and 1(b), which are longitudinal cross sections of a variable focal length camera in accordance with the present invention, respectively illustrate the configuration of a camera with short and long focal length states thereof.

As shown in FIGS. 1(a) and 1(b), a main lens 1 is attached to a body tube 2 which is supported by a rectilinear bar 5 in the body tube cover 6, and a sub lens 3 is attached to an extender 4 which is supported by an extender bar 7 so as to be rotatable in the body tube cover 6.

The extender 4 is moved from the position of FIG. 1(a) to that of FIG. 1(b) while being interlocked with the body tube cover 6 which is guided by a support bar 8 and a guide bar 10 for back and forth movement. The sub-lens 3 is thereby moved between a position located on the photographing optical axis and a retracted position. This moving mechanism is not essential to the present invention and will not be further described herein. (The same type of moving mechanism is described in detail, for example, in Japanese Utility Model Laid-Open No. 176008/1984).

The camera also has the following component parts: a bar base plate 9; a focus adjusting machine screw 11 disposed on the body tube 2; a light-shield plate 12; a bellows 13 connecting the body tube cover 6 to the light-shield plate 12; a camera body 14; a sprocket 15; a rotatable ring 16; a body tube spring 17 for applying an urging force to the body tube 2 thereby biasing the focus adjusting pin 11 against the rotatable ring 16; a shutter 18; a cover 19; and a turn-over switch 20 consisting of a movable contact piece 20a capable of contacting the body tube cover 6, and a fixed contact piece 20b.

In the short focal length state illustrated in FIG. 1(a), the body tube cover 6 is retracted and the sub-lens 3 is retracted from the photographing optical path. In this state, the turn-over switch 20 is in the on state while the movable contact piece 20a is pressed by the body tube cover 6 against the fixed contact piece 20b and maintained in contact with the same.

In the long focal length state illustrated in FIG. 1(b), the body tube cover 6 is extended; the sub-lens 3 is located on the photographing optical axis; and the turn-over switch is in the off state. Therefore, it is possible to detect whether the camera is in either the short or long focal length state depending on the on/off state of the turn-over switch 20.

FIG. 2 shows in plan view a general arrangement for the shutter 18 which is of a semi-opening type and which is constituted by shutter blades 22 and 23 and a shutter base plate 21. The shutter blades 22 and 23 are fitted respectively to the pivot pins 21a and 21b of the shutter base plate 21 and are opened and closed by suitable shutter driving means of a conventional type.

A reflecting type photointerrupter 24 facing a reflecting plate 25 is placed on the point of intersection between the courses of movement of an extended end portion 23a of the shutter blade 23 and an end portion 22a of the shutter blade 22. The shutter blades 22 and 23 are positioned such that their end portions pass between the photointerrupter 24 and the reflecting plate 25.

As the shutter control mechanism (not shown in the figure) is operated and the shutter blades 22 and 23 start to open, the extended end portion 23a of the blade 23 is retracted from the front side of the photointerrupter 24. When the shutter blades 22 and 23 are fully opened, the end portion 22a of the shutter blade 22 is placed in front of the photointerrupter 24. Accordingly, the output of the photointerrupter 24 changes when the shutter blades 22 and 23 start to open and when they are fully opened, so that the start of opening and the fully opened state of the shutter can be respectively detected.

Figure 3A:
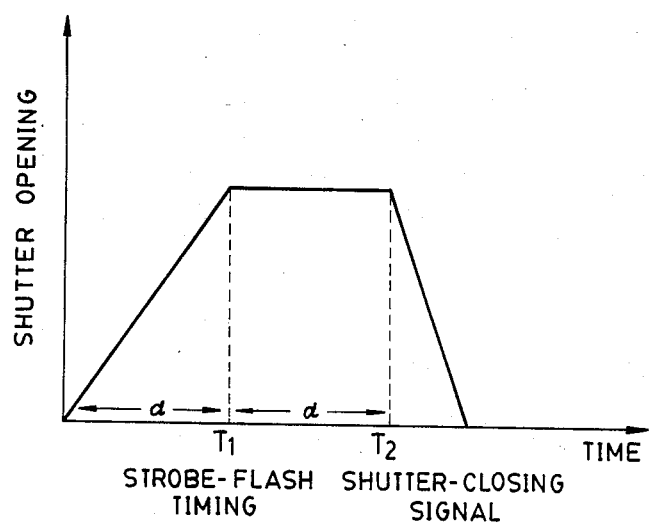
FIGS. 3(a) and 3(b) are graphs depicting shutter opening as a function of time.
Figure 3B:
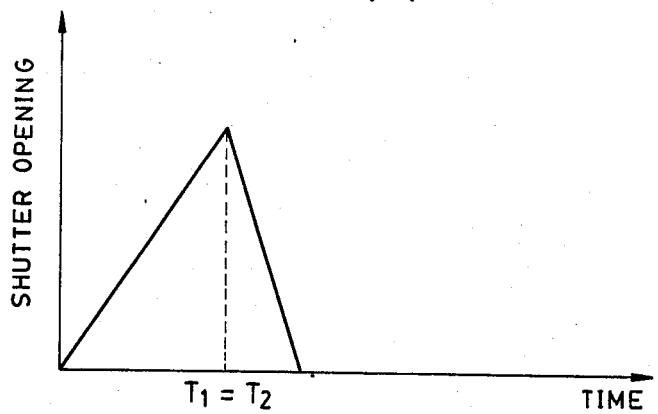

FIGS. 3(a) and 3(b) are graphs showing shutter opening as a function of time. Referring to FIG. 3(a), a shutter-closing signal is issued at a time $T_2$ later than a time $T_1$ indicating strobe-flash timing. FIG. 3(a) shows a case in which the time $T_1$ of the strobe-flash timing is equal to the time $T_2$. FIG. 3(b) shows a case in which the time $T_1$ of the strobe-flash timing is greater than the time $T_2$.

Figure 4:
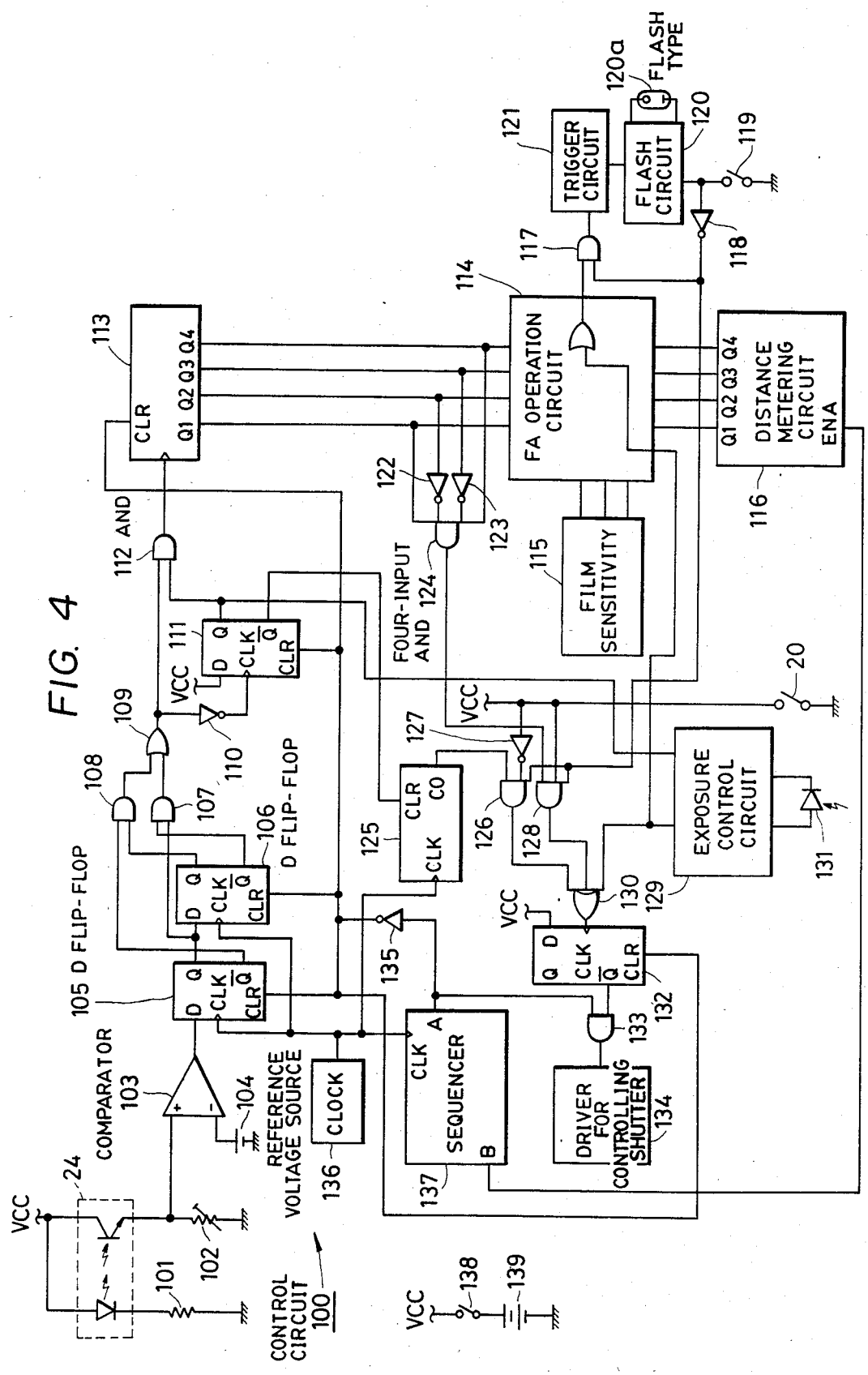
FIG. 4 is a circuit diagram of a control circuit.

FIG. 4 is a circuit diagram showing an example of a control circuit 100 applied to a variable focal length camera in accordance with the present invention. As shown in FIG. 4, the control circuit includes: a resistance 101 which determines the current which is to flow through a light-emitting element of the photointerrupter 24; a variable resistance 102 for converting the output current of the light-receiving element of the photointerrupter 24 into a voltage; a reference voltage source 104; a comparator 103 for comparing the voltage generated on the variable resistance 102 with that of the reference voltage source 104; D flip-flops 105 and 106; AND gates 107 and 108; an OR gate 109; and an inverter 110.

The control circuit 100 further includes: a D flip-flop 111; an AND gate 112; a four-stage binary up counter 113; an FA (an abbreviation of "flashmatic") operation circuit 114; a film sensitivity input circuit 115; a distance metering circuit 116 of a known type for measuring the distance to an object to be photographed; and AND gate 117; an inverter 118; an FA switch 119 which turns on when a strobe-flash is used; a flash circuit 120 of a known type; and a xenon discharge tube 120a.

The circuit 100 further includes: a trigger circuit 121 which outputs a light-emitting trigger signal for triggering the flash circuit 120; inverters 122 and 123; an four-input AND gate 124; a counter 125 which outputs a high-level signal from its CO terminal after counting a predetermined time corresponding to the camera-shake limit; three-input AND gates 126 and 128; an inverter 127; and an exposure control circuit 129 of a known type having a photoelectric transfer element 131.

Other constituents of the circuit 100 are: a three-input OR gate 130; a D flip-flop 132; an AND gate 133; a driver 134 for controlling the shutter blades 22 and 23; an inverter 135; a clock generating circuit 136; a part of a sequencer 137 for controlling a sequence of movements of the camera during photographing; a switch 138 which supplies the power of a power source 139 to the respective portions of the control circuit when turned on by an interlocked operation with a shutter release button (not shown).

Next, the functions of control circuit 100 are described. When the release button is pressed by the photographer, the switch 138 is turned on and the power source 139 is connected to the respective portions of the control circuit, thereby initiating operation of the control circuit.

The sequencer 137 receives a clock signal from the clock generating circuit 136 and starts sequential processes. The sequencer 137 first outputs a high level signal from its B terminal to ENA (an abbreviation of "enable") terminal of the distance metering circuit 116, thereby conducting distance metering and focus adjustment operations. Simultaneously, the distance metering circuit 116 outputs a distance value in the form of 4-bit digital information signal from its terminals $Q_1$, $Q_2$, $Q_3$ and $Q_4$ to the FA operation circuit 114.

When the distance metering is finished, the sequencer 137 outputs a high level signal from its A terminal to the AND gate 133 and the inverter 135. The inverter 135 supplies an inverted output signal to the D flip-flops 105, 106, 111 and 132, and a CLR terminal of the up counter 113, each of which is turned from the reset state into the operative state.

Since a high level $\overline{Q}$ output of the flip-flop has been supplied to the AND gate 133, the output of the AND gate 133 also becomes a high level when the output A of the sequencer 137 is set to high, so that the driver 134 starts to open the shutter blades 22 and 23. Simultaneously, the end portion 23a of the blade 23 and the slits 22b formed in the blade 22 move across the optical path of the photointerrupter 24.

Figures 5, 6:
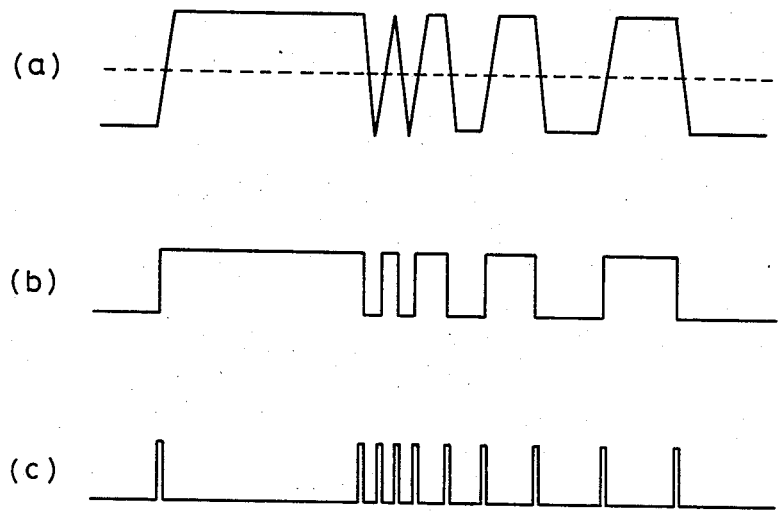
FIG. 6 is a table showing the relationship between the slits of a shutter blade and the aperture.

Then, a voltage waveform such as shown in FIG. 5(a) is generated on the semi-fixed resistance 102 and supplied to the non-inverted input terminal of the comparator 103. The reference voltage source 104 supplies the reference voltage to the inverted input terminal of the comparator 103. This voltage has a waveform as illustrated by the broken line in FIG. 5.

Accordingly, the output of the comparator 103 which exhibits a waveform as shown in FIG. 5 (b) is supplied to a D terminal of the D flip-flop 105. As the clock generating circuit 136 is supplying clock signals to clock terminals of the D flip-flops 105 and 106, the AND gates 107 and 108 make the OR gate 109 output one-clock-width pulses one after another, as shown in FIG. 5 (c), in accordance with the rise or fall of the output of the comparator 103. The initial pulse CS in these pulses corresponds to the start of exposure and the remaining pulses correspond to aperture positions stepped by 0.5 from F11 to F2.8 of 0.5.

The initial output pulse CS output by the OR gate 109 is inverted by the inverter 110 and is latched by the D flip-flop 111. That is, the output at a Q terminal of the D flip-flop 111 is set to be high in response to the fall of the initial pulse supplied from the OR gate 109, and it is supplied to the AND gate 112 and the exposure control circuit 129.

The output of the AND gate 112 is then supplied, as aperture pulses corresponding to aperture setting of F11 to F2.8, to the up counter 113. The counted values thereby obtained are put out in the form of a 4-bit digital code, as shown in the table of FIG. 6.

The exposure control circuit 129 starts a shutter opening duration in accordance with a photometric value of a light measured by the photoelectric element 131. Simultaneously, the $\overline{Q}$ output of the D flip-flop 111 is supplied to the CLR terminal of the counter 125. The counter 125 counts, from the reset state, clock signals supplied from the clock generating circuit 136 when the signal at the CLR terminal is turned from a high level into low level. After a predetermined amount of time has passed, the counter 125 outputs a high level signal from its CO terminal to the AND gate 126.

The 4-bit aperture signals put out by the up counter 113 are respectively supplied to the FA operation circuit 114, AND gate 124, inverters 122 and 123. When the aperture is perceived to be F2.8 (full-open), the output of the AND gate 124 goes to a high level and is supplied to the AND gate 128, as shown in the table of FIG. 6.

In the FA operation circuit 114, an aperture value which corresponds to flash-exposure conditions determined by 3-bit film sensitivity information from the film sensitivity input circuit 115 and by 4-bit distance information from the distance metering circuit 116 is calculated or selected, and compared with 4-bit aperture information supplied from the counter 113, thereby determining the timing for emitting the flash. The FA operation circuit 114 then receives a signal indicating the completion of exposure from the exposure control circuit 129 and outputs a high level signal to the AND gate 117 at an earlier occurring one of these timings.

During photographing other than with a flash, the FA switch 119 is open and the output of the inverter 118 is maintained at low level, so that the AND gates 117, 126 and 128 do not output high level signals and the flash circuit 120 is not charged.

Accordingly, when the FA 119 switch is open, the OR gate 130, whose input is connected to the outputs of the AND gates 126 and 128 and the exposure control circuit 129, outputs a high level signal only when the exposure completion signal of the exposure control circuit 129 becomes a high level. This output signal of the OR gate 130 is latched by the D flip-flop, and the $\overline{Q}$ output thereof is changed from a low to a high level.

As the $\overline{Q}$ output of the D flip-flop becomes low, the AND gate 133, which receives at its input this $\overline{Q}$ output signal, inverts its output from a high level to a low level. The driver circuit 134 is thereby stopped so that the shutter blades 22 and 23 start to close while the exposure control is finished. Then, a portion of the sequencer 137, which is not shown in the drawings, performs the remaining sequential processes, e.g., winding of the film, thereafter finishing the photography operations.

When the FA switch 119 is turned so as to set a flash mode, a high level signal is supplied from the inverter 118 to the AND gates 117, 126 and 128. The AND gate 117 supplies a trigger timing signal from the FA operation circuit 114 to the trigger circuit 121, thereby emitting a flash.

The AND gates 126 and 128 are controlled by the on-and-off operation of the turn-over switch 20 which switches at a long or short focal length. That is, the turn-over switch 20 is turned on at a short focal length so as to supply a low level voltage to the AND gate 128 and the inverter 127. Therefore, the AND gate 128 does not output at high level, and the AND gate 126, which receives at its input a high level signal inverted by the inverter 127, outputs a high level signal to the OR gate 130 when the output of the counter 125 becomes high. In other words, the shutter-closing timing is either the time counted by the counter 125 (short focal length camera-shake limit) or that of the exposure completion signal supplied by the exposure control circuit 129, whichever is shorter.

During photographing at a long focal length, the turn-over switch 20 is turned off, and a high level signal is supplied to the AND gate 128 while a low level signal is supplied from the inverter 127 to the AND gate 126.

Accordingly, an F2.8 signal (fully-open signal) put out by the AND gate 124 is supplied through the AND gate 128 to the OR gate 130. Therefore, during the long focal length photographing, the shutter blades 22 and 23 start to close in accordance with the F2.8 signal (fully-open signal) or the exposure completion signal.

It will go without saying that the time counted by the counter 125 is longer than that for detecting the F2.8 aperture (fully-open).

In the arrangement in accordance with the present invention, as described above, the shutter is shut off after a predetermined time during strobe light photography at a short focal length, and is shut off when the fully opened state of the shutter blades is perceived during strobe light photography at a long focal length so as to set the shutter closing time later in the case of a short focal length and earlier in the case of a long focal length. This arrangement ensures that camera shake can be prevented during strobe light photography at a long focal length and that it is possible to prevent excessively increasing the shutter speeding causing under-exposure during strobe light photography at a short focal length.

According to the present invention, as described above, the shutter is shut off when the fully opened state of the shutter is perceived while observing the actual movement of the shutter during strobe light photography at a long focal length, thereby ensuring the fully opened state of the shutter and eliminating the risk of under-exposure while securely preventing camera shake.

In the above-described embodiment, the shutter is shut off after a predetermined time has passed from the state of the opening movement of the shutter, but this arrangement may be altered such that the shutter is shut off after a predetermined time has passed from the perception of the fully opened state of the shutter blades.

What is claimed is:

1. A shutter control apparatus for use in a variable focal length camera, comprising:
   a lens shutter movable between a fully-opened state and a closed state;
   a detecting means for detecting a fully opened state of said lens shutter, said detecting means detecting the state of said shutter in order to detect the fully opened state of said shutter;
   a discriminating means for discriminating the focal length of a photographing optical system; and
   a control means for closing said lens shutter in response to the detection of the fully opened state of said lens shutter made by said detecting means when said discriminating means determining that said photographing optical system has a long focal length during flash photography.

2. A shutter control apparatus according to claim 1, wherein said control means includes a timer means for counting a predetermined time period and at the end of the time period closing said lens shutter if said discriminating means determines that said photographing optical system has a short focal length during flash photography.

3. A shutter control apparatus according to claim 2, wherein said timer means closes said shutter lens later during flash photography of a short focal length, relative to the time that said shutter closes, after opening fully, in response to said detecting means during flash photography of a long focal length.

4. A shutter control apparatus according to claim 1, wherein said detecting means includes an optical detection means for detecting the state of said lens shutter.

5. A shutter control apparatus according to claim 4, wherein said optical detection means includes a photointerrupter.

6. A shutter control apparatus according to claim 1, wherein said discriminating means includes a switch means for determining the state of the focal length of a variable focal length photographing optical system, said switch means responding to the movement of said optical system displaced in accordance with the focal length change of said variable focal length photographing optical system.

7. A shutter control apparatus according to claim 1, wherein said control means is arranged so as to instantly close said lens shutter when said detecting means detects the fully opened state of said lens shutter.

8. A shutter control apparatus according to claim 2, wherein said timer means includes starting means which starts the counting of said predetermined time period in response to the start of opening of said lens shutter.

* * * * *

UNITED STATES PATENT AND TRADEMARK OFFICE
CERTIFICATE OF CORRECTION

PATENT NO. : 4,708,454                                    Page 1 of 2

DATED : November 24, 1987

INVENTOR(S) : Takanori KODAIRA, ET AL.

It is certified that error appears in the above-identified patent and that said Letters Patent is hereby corrected as shown below:

AT [57] IN THE ABSTRACT:

Line 9, "determining" should read --determines--.

IN THE DRAWINGS:

Figure 1(a), "2 GIDY TUBE"
          should read --2 BODY TUBE--.

COLUMN 1

Line 14, "ovbiated" should read --obviated--.
   Line 30, "under-exposure" should read
          --underexposure--.

COLUMN 2

Line 40, "pin" should read --screw--.

UNITED STATES PATENT AND TRADEMARK OFFICE
CERTIFICATE OF CORRECTION

PATENT NO. : 4,708,454

DATED : November 24, 1987

INVENTOR(S) : Takanori KODAIRA, ET AL.

It is certified that error appears in the above-identified patent and that said Letters Patent is hereby corrected as shown below:

COLUMN 6

Line 21, "speeding" should read --speed--.
    Line 21, "under-exposure" should read --underexposure--.
    Line 30, "under-exposure" should read --underexposure--.
    Line 34, "state" should read --start--.

Signed and Sealed this

Third Day of May, 1988

Attest:

DONALD J. QUIGG

Attesting Officer

Commissioner of Patents and Trademarks